United States Patent
Wiedmann et al.

(10) Patent No.: US 11,855,555 B2
(45) Date of Patent: Dec. 26, 2023

(54) CONTROL DEVICE FOR AN INVERTER, INVERTER FOR A VEHICLE, VEHICLE AND METHOD OF OPERATING AN INVERTER

(71) Applicant: Valeo Siemens eAutomotive Germany GmbH, Erlangen (DE)

(72) Inventors: Karsten Wiedmann, Spardorf (DE); Timur Werner, Erlangen (DE); Markus Reymann, Nuremberg (DE)

(73) Assignee: VALEO SIEMENS EAUTOMOTIVE GERMANY GMBH, Erlangen (DE)

( * ) Notice: Subject to any disclaimer, the term of this patent is extended or adjusted under 35 U.S.C. 154(b) by 415 days.

(21) Appl. No.: 17/277,549

(22) PCT Filed: Sep. 19, 2019

(86) PCT No.: PCT/EP2019/075241
§ 371 (c)(1),
(2) Date: Mar. 18, 2021

(87) PCT Pub. No.: WO2020/058445
PCT Pub. Date: Mar. 26, 2020

(65) Prior Publication Data
US 2022/0029556 A1    Jan. 27, 2022

(30) Foreign Application Priority Data
Sep. 20, 2018   (DE) ..................... 10 2018 123 207.1

(51) Int. Cl.
*H02M 7/538*     (2007.01)
*H02M 7/5387*    (2007.01)
(Continued)

(52) U.S. Cl.
CPC .......... *H02M 7/53875* (2013.01); *H02P 3/22* (2013.01); *H02P 23/0027* (2013.01)

(58) Field of Classification Search
CPC .. H02P 3/22; H02P 23/0027; H02M 7/53875; H02M 7/5387; H02J 2310/48; B60L 7/003
See application file for complete search history.

(56) References Cited

U.S. PATENT DOCUMENTS 6,239,566 B1   5/2001   Tareilus et al.
9,106,174 B2   8/2015   Sekiya et al.
(Continued)

FOREIGN PATENT DOCUMENTS

DE   112012001311 T5   1/2014
DE   102016118350 A1   3/2017
(Continued)

OTHER PUBLICATIONS

PCT/ISA/210, "International Search Report for International Application No. PCT/EP2019/075241," dated Jan. 10, 2020.

*Primary Examiner* — Alex Torres-Rivera
(74) *Attorney, Agent, or Firm* — Manabu Kanesaka (57) ABSTRACT

The invention relates to a control device for an inverter which includes three half-bridges each having a first power switching element connected to a first DC voltage potential and a second power switching element connected to a second DC voltage potential. The control device is arranged for driving the power switching elements for converting a DC voltage present between the DC voltage potentials into a polyphase AC current in a normal operating mode and for transferring the inverter from the normal operating mode into a safe operating mode. The control device is further set up to alternately drive the power switching elements in the safe operating mode for switching single-phase active short circuits and for switching two-phase active short circuits.

9 Claims, 7 Drawing Sheets

(51) Int. Cl.
*H02P 3/22* (2006.01)
*H02P 23/00* (2016.01)

(56) References Cited

U.S. PATENT DOCUMENTS

| | | | |
|---|---|---|---|
| 9,806,649 | B2 | 10/2017 | Lopez De Arroyabe |
| 10,348,227 | B2* | 7/2019 | Ichikawa .................. H02P 6/24 |
| 2010/0244753 | A1 | 9/2010 | Boudjemai et al. |
| 2013/0141027 | A1* | 6/2013 | Nakata ...................... H02P 6/15 |
| | | | 318/400.23 |
| 2013/0307446 | A1* | 11/2013 | Ichikawa .................. H02P 6/24 |
| | | | 318/362 |
| 2017/0093323 | A1 | 3/2017 | Saha et al. |
| 2018/0123474 | A1 | 5/2018 | Tremblay |
| 2018/0241337 | A1* | 8/2018 | Zou .......................... H02M 7/00 |
| 2020/0259425 | A1* | 8/2020 | Shimada ................. H02M 1/36 |

FOREIGN PATENT DOCUMENTS

| | | |
|---|---|---|
| DE | 102016204854 A1 | 9/2017 |
| WO | 2015/090746 A1 | 6/2015 |

* cited by examiner

Prior Art

Fig. 6

Prior Art

Fig. 7

CONTROL DEVICE FOR AN INVERTER, INVERTER FOR A VEHICLE, VEHICLE AND METHOD OF OPERATING AN INVERTER

RELATED APPLICATIONS

The present application is National Phase of International Application No. PCT/EP2019/075241 filed Sep. 19, 2019, and claims priority from German Application No. DE 10 2018 123 207.1 filed Sep. 20, 2018, the disclosure of which is hereby incorporated by reference herein in its entirety.

The present invention relates to a control device for an inverter comprising three half-bridges each having a first power switching element connected to a first DC voltage potential and having a second power switching element connected to a second DC voltage potential, the control device being arranged to drive the power switching elements to convert a DC voltage present between the DC voltage potentials into a polyphase AC current in a normal operating mode and to transfer the inverter from the normal operating mode to a safe operating mode.

In addition, the invention relates to an inverter for a vehicle, a vehicle and a method of operating an inverter.

Inverters are used to convert a DC voltage present at a DC voltage input into a multi-phase AC current. Particularly with regard to the use of an inverter to supply an electric machine in a drive train of an electrically drivable vehicle, there is a requirement to transfer the inverter from this normal operating mode to a safe operating mode. This may be necessary after faults in the drive train or to protect the drive train.

It has already been proposed to realize the safe operating mode by means of a freewheel (Safe Pulse Off—SPO) or by means of a complete active short circuit (ASC). Depending on the method used, an undesirably high DC link voltage and/or undesirably high phase currents and/or undesirable braking torques can occur, caused by energy stored in inductors of the electrical machine when the inverter is transferred from the normal operating mode to the safe operating mode. To counteract the undesired DC link voltage or phase currents, it is well known to design the components of the inverter in an oversized manner, which is neither necessary for the normal operating mode nor results in an improvement of the operating performance. An example of such oversizing is the use of high temperature magnets or the use of semiconductors with higher current carrying capacity than required. Conventional inverters are correspondingly expensive and material-intensive.

The invention is therefore based on the object of specifying an improved way of implementing a safe operating mode, whereby in particular high phase currents and a high DC link voltage are to be avoided.

In order to achieve this object, it is proposed in accordance with the invention in a control device of the type mentioned at the beginning that the control device is further set up to drive the power switching elements alternately in the safe operating mode for switching single-phase active short circuits and for switching two-phase active short circuits.

The invention is based on the realization that transient phase currents can also be generated when switching a single-phase or a two-phase short circuit. However, their characteristics differ considerably. The invention takes advantage of this difference and switches alternately between the single-phase active short circuit and the two-phase active short circuit, so that the generation of high phase currents can be limited such that they are below permissible maximum values for the operation of the inverter or a drive train comprising the inverter.

Advantageously, the phase currents induced by inductances of the electric machine decay rapidly during the control by the control device according to the invention without exceeding the maximum permissible values. In this way, over-dimensioning of components of the inverter or of a drive train comprising the inverter can be avoided. A high level of safety is thus achieved without expensive components, such as high-temperature magnets and/or particularly current-resistant power switching elements. At the same time, alternating switching is relatively easy to implement and is largely independent of the last operating state in normal operating mode. This entails further advantages, such as a reduction in costs, development effort, installation space, in particular for a DC link capacitor, as well as dispensing with the use of complex components and a long service life and robustness of the drive train.

More conveniently, the power switching elements comprise insulated gate bipolar transistors (IGBT) or power MOSFET. The first and second DC voltage potentials are different. Here, typically the first DC potential is lower than second DC potential. However, the first DC potential may also be higher than the second DC potential. Preferably, the control device is further arranged to transfer the inverter from the normal operating mode to the safe operating mode when it receives a control signal indicating the transfer, in particular from an external control device.

The control device according to the invention is preferably further set up to control one first power switching element for conduction in each case when switching a single-phase active short circuit and to control two first power switching elements for conduction in each case when switching a two-phase active short circuit. Consequently, both the single-phase and the two-phase short circuits are performed by power switching elements connected to the same DC potential. It can also be provided that the control device is set up so that the first power switching element, which is controlled for conducting when the single-phase active short circuit is switched, is not controlled for conducting when the two-phase active short circuit is switched.

Typically, the power switching elements not controlled for conduction are controlled for blocking.

Advantageously, the control device according to the invention can further be set up to first trigger the power switching elements to switch a single-phase active short circuit at the start of the safe operating mode. This enables a particularly rapid decay of the energy stored in the windings of the electrical machine already at the beginning of the safe operating mode.

In this context, it is particularly preferred that the control device is also set up to determine phase current values of the multiphase alternating current and to select a power switching element for the first single-phase active short circuit whose half-bridge carries the highest phase current in terms of magnitude when it is transferred to the safe operating mode. Thus, advantageously, the electrical energy of that phase is converted first which has the highest phase current in terms of magnitude at the time the safe state is requested.

According to a particular embodiment, the control device according to the invention is further set up to switch the single-phase active short circuits in each case for a first time period and the two-phase active short circuits in each case for a second time period that differs from the first time period. Particularly preferably, the first time period or the second time period is at most 45%, especially preferably at most 40%, of the sum of the first and the second time periods. This allows the control device to be flexibly adapted to design peculiarities of the inverter and/or the electrical machine.

Alternatively or additionally, it can be provided that the inverter has three further half-bridges each with first power switching elements and with second power switching elements, the control device being further arranged to drive the power switching elements of the further half-bridges in the safe operating mode for switching single-phase active short circuits, when the power switching elements of the first half-bridges are controlled for switching the two-phase active short circuit, and for switching two-phase active short circuits when the power switching elements of the first half-bridges are controlled for switching the single-phase active short circuit. Thus, in the case of six-phase or multiphase alternating currents, the current flows can be distributed in a particularly balanced manner in the safe operating mode.

In addition, the invention relates to an inverter for a vehicle, comprising three half-bridges each having a first power switching element connected to a first DC voltage potential and having a second power switching element connected to a second DC voltage potential, and a control device according to the invention.

The invention further relates to a vehicle comprising an electric machine adapted to drive the vehicle, and an inverter according to the invention adapted to power the electric machine Finally, the invention also relates to a method of operating an inverter comprising three half-bridges each having a first power switching element connected to a first DC potential and having a second power switching element connected to a second DC potential, comprising the following steps:

Driving the power switching elements in a normal operating mode to convert a DC voltage present between DC potentials to a polyphase AC current;

Transferring the inverter from normal operating mode to a safe operating mode; and alternate switching of single-phase active short circuits and two-phase active short circuits by the power switching elements in safe operating mode.

All the embodiments relating to the control device according to the invention can be applied analogously to the inverter according to the invention, the vehicle according to the invention and the process according to the invention, so that the advantages mentioned above can also be achieved with these.

Figure 1:
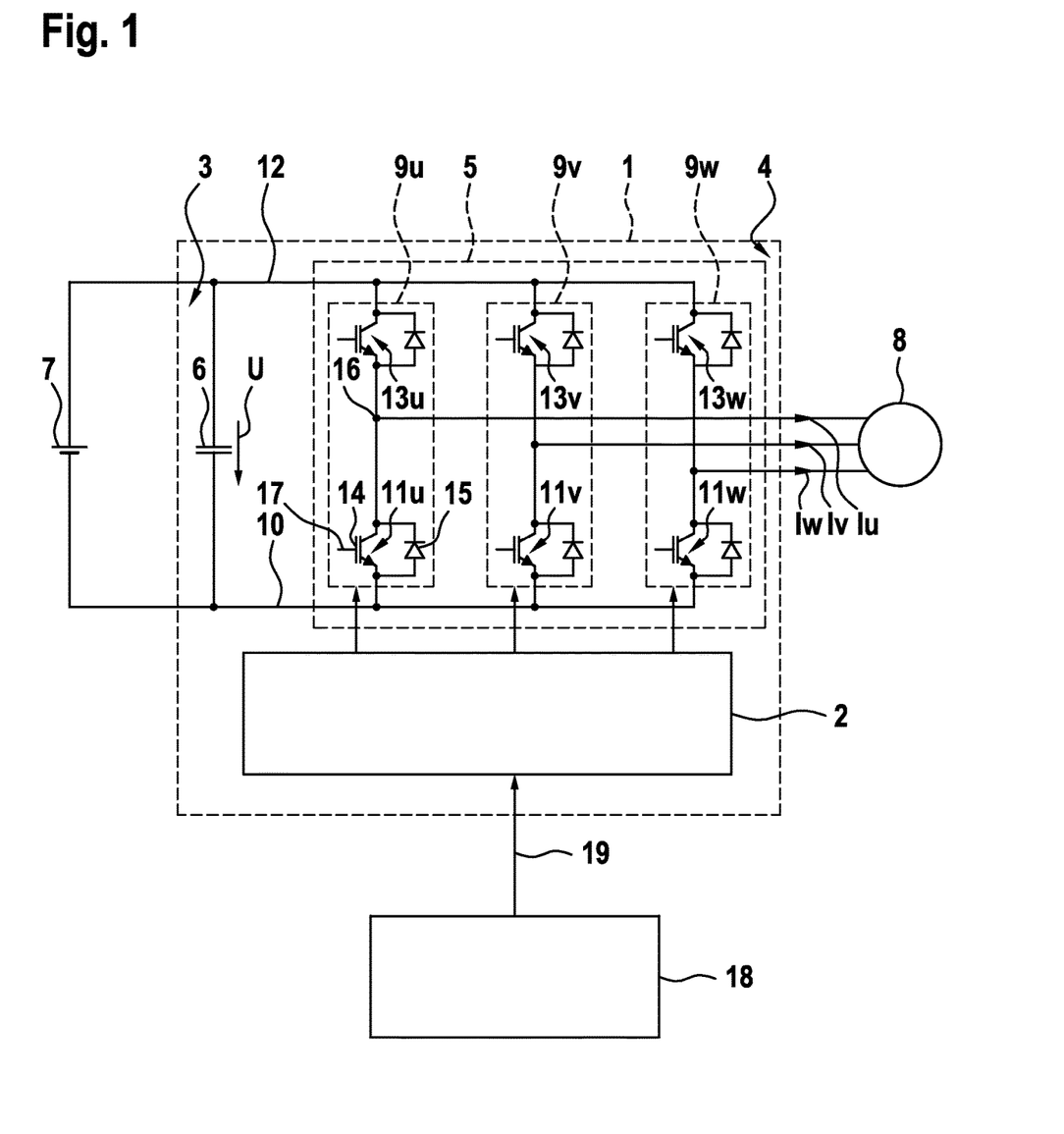
FIG. 1 A circuit diagram of a first embodiment of the inverter according to the invention with an embodiment of the control device according to the invention.

Further advantages and details of the present invention will be apparent from the embodiments described below and from the drawings. These are schematic representations and show:

FIG. 1 is a circuit diagram of an embodiment of an inverter 1 with an embodiment of a control device 2.

In addition, the inverter 1 comprises a DC voltage input 3, an AC voltage output 4, a power unit 5, and a DC link capacitor 6 connected in parallel with the DC voltage input 3. The inverter 1 converts a voltage U applied to the DC voltage input 3 and provided by a high-voltage battery 7 into a polyphase, in this case three-phase, AC current provided at its AC current output 4. An electric machine 8, here exemplarily in the form of a permanently excited synchronous machine, is connected to the AC output 4.

The power unit 5 comprises three half-bridges 9u, 9v, 9w, each formed by a series connection of first power switching elements 11u, 11v, 11w connected to a first DC voltage potential 10 of the DC voltage input 3 and second power switching elements 13u, 13v, 13w connected to a second DC voltage potential 12 of the DC voltage input 3. Exemplarily, in FIG. 1, the first DC potential 10 is the potential provided for connection to a negative terminal of the high-voltage battery 7, and the second DC potential 12 is the potential provided for connection to a positive terminal of the high-voltage battery 7. However, the potential provided for connection to the negative terminal and the power switching elements connected thereto may also be used as the second DC voltage potential and the second power switching elements, respectively, and the potential provided for connection to the positive terminal and the power switching elements connected thereto may be used as the first DC voltage potential and the first power switching elements, respectively, without any further modifications or restrictions.

Each power switching element 11u, 11v, 11w, 13u, 13v, 13w comprises an insulated gate bipolar transistor (IGBT) 14 and a freewheeling diode 15 connected in parallel therewith. Alternatively, a respective power switching element 11u, 11v, 11w, 13u, 13v, 13w may be implemented by a power MOSFET. A center attack 16 of a respective half-bridge 11u, 11v, 11w is connected to the AC output 4 at which phase currents $I_u$, $I_v$, $I_w$ of the polyphase AC current are provided to the electric machine 8.

The control device 2 is arranged to control the power switching elements 11u, 11v, 11w, 13u, 13v, 13w in a normal operating mode for converting the DC voltage U applied to the DC voltage input 3 into the polyphase AC current applied to the AC current output 4. For driving, the control device 2 is connected to a control input 17 of a respective power switching element 11u, 11v, 11w, 13u, 13v, 13w.

When a fault condition is detected by an external control device 18, the transfer of the inverter 1 from the normal operation mode to a safe operation mode is initiated. The control device is arranged to alternately trigger the power switching elements 11u, 11v, 11w, 13u, 13v, 13w in the safe operating mode for switching single-phase active short circuits and for switching two-phase active short circuits. The control device applies this switching strategy as soon as it receives a signal 19 indicating the transfer to the safe operating mode from the control device 18.

A single-phase active short circuit is generally characterized by a first power switching element 11u, 11v, 11w or a second power switching element 13u, 13v, 13w being driven to conduct, while all other power switching elements 11u, 11v, 11w, 13u, 13v, 13w are driven to block. In contrast, in a two-phase active short circuit, generally two first power switching elements 11u, 11v, 11w or two second power switching elements 13u, 13v, 13w are driven to conduct, while all remaining power switching elements 11u, 11v, 11w, 13u, 13v, 13w are driven to block.

Figure 2:
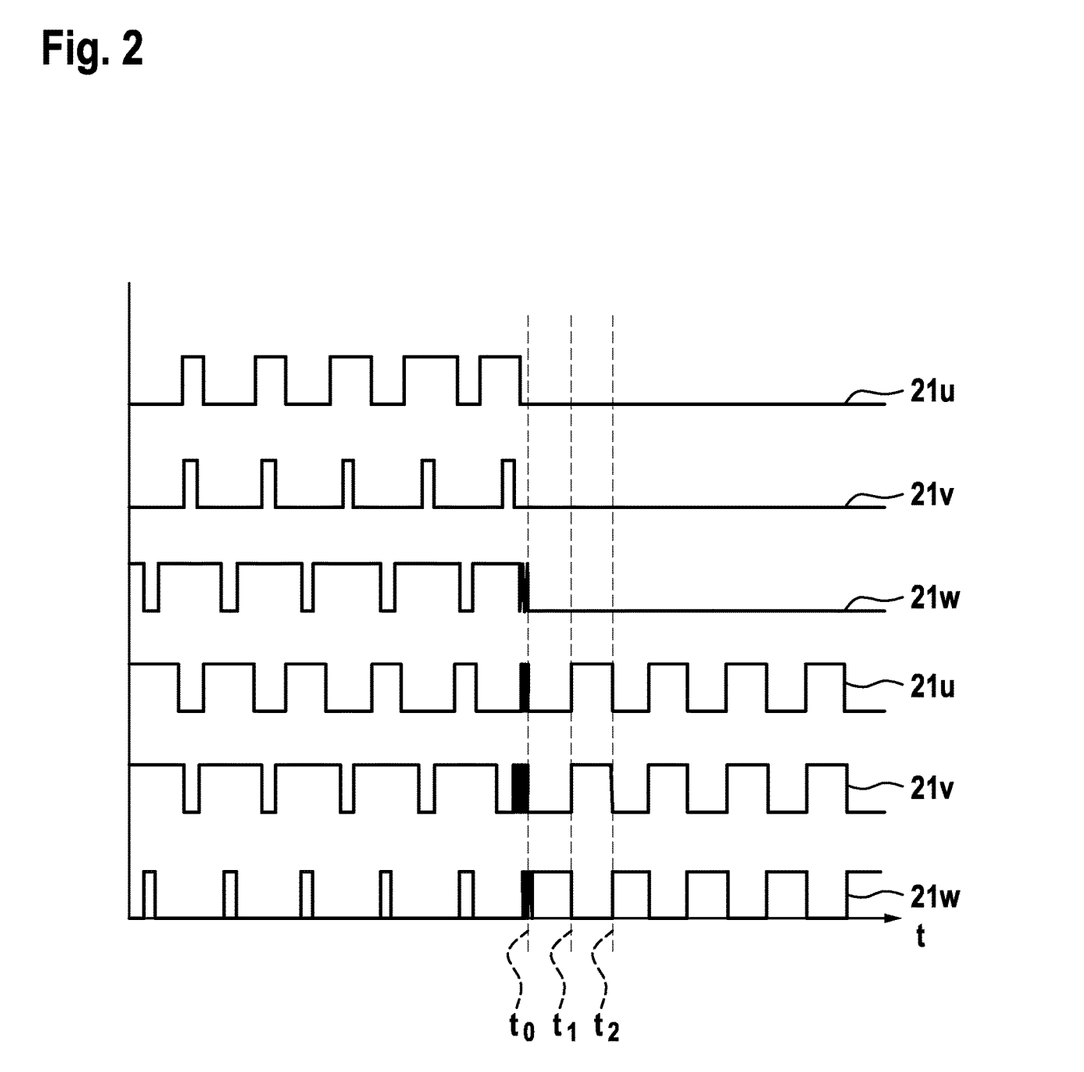
FIG. 2 a pulse diagram over time for driving power switching elements of the inverter shown in FIG. 1.

FIG. 2 is a pulse diagram over time t for driving the power switching elements 11u, 11v, 11w, 13u, 13v, 13w of the inverter 1. Here, a pulse waveform 20u is assigned to the first power switching element 11u, a pulse waveform 20v is assigned to the first power switching element 11v, and a pulse waveform 20w is assigned to the first power switching element 11w. Similarly, a pulse waveform 21u is associated with the second power switching element 13u, a pulse waveform 20v is associated with the second power switching element 21v, and a pulse waveform 21w is associated with the second power switching element 13w.

At a time $t_0$, the control device 2 receives the signal 19 and then terminates the normal operating mode shown for times $t < t_0$. The control unit 2 first determines which phase current $I_u$, $I_v$, $I_w$ is the largest in terms of magnitude at time $t_0$ on the basis of setpoint values specified for the normal operating mode. In the present case, this is the phase current $I_w$ (cf. FIG. 3). By means of the half-bridge 9w assigned to this phase current, a single-phase active short-circuit is first switched for a first period of time between the time $t_0$ and a time $t_1$. For this purpose, the control device 2 controls the first power switching element 11w for conducting and the other power switching elements 11u, 11v, 13u, 13v, 13w for blocking.

Then, for a second period of time between the time $t_1$ and a time $t_2$, the control device 2 controls the other two first power switching elements 11u, 11v to conduct and the remaining power switching elements 11w, 13u, 13v, 13b to block. This pulse sequence continues periodically after time $t_2$.

Figure 3:
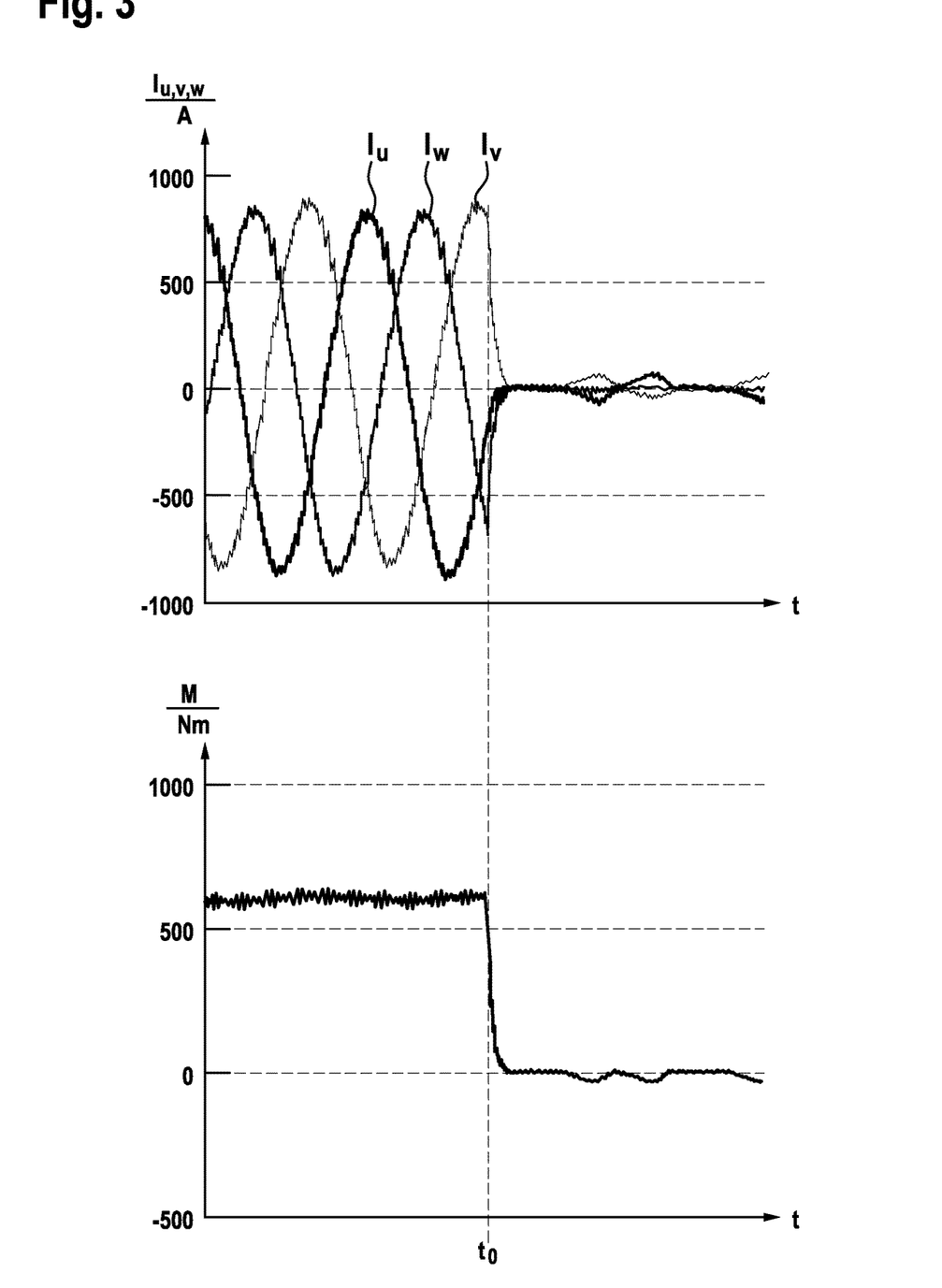
FIG. 3 curves of phase currents and a torque during operation of the inverter shown in FIG. 1.

FIG. 3 shows the curves of the phase currents $I_u$, $I_v$, $I_w$ and a torque M of the electric machine 8 over time t, whereby the time axes in FIG. 3 are compressed by a factor of 10 compared to those in FIG. 2. FIG. 2 thus shows the pulse diagram over a duration of approx. 1 ms, whereas FIG. 3 shows the curves over a duration of approx. 10 ms. The current and torque values shown result from a purely exemplary configuration.

It is obvious that the switching strategy described above leads to a rapid decay of the phase currents $I_u$, $I_v$, $I_w$, whereby harmful current peaks are avoided. It can also be seen from the torque M curve that the torque M is rapidly reduced to a value of around 0 Nm from time $t_0$ onwards and only insignificant braking torques occur.

Figure 4:
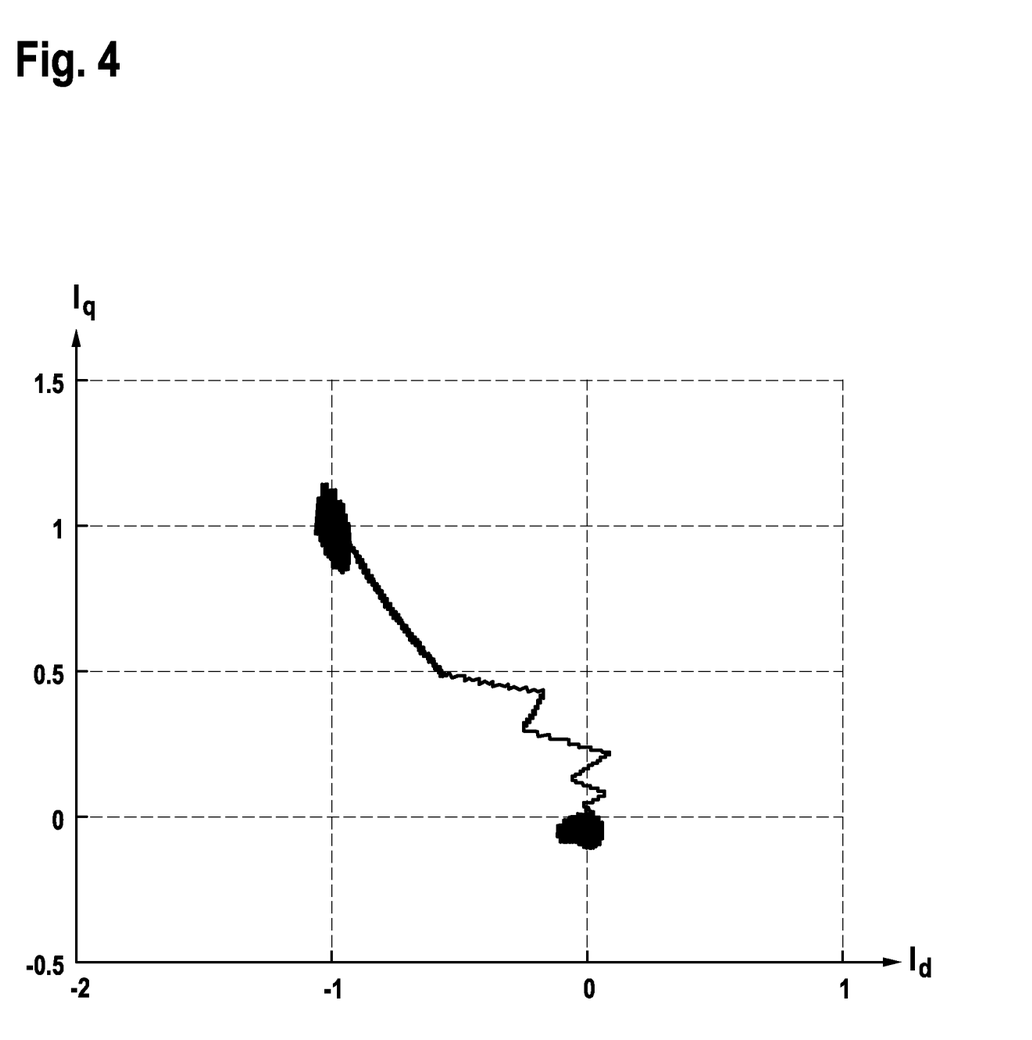
FIG. 4 a locus of phase currents in dq coordinates during operation of the inverter shown in FIG. 1.

FIG. 4 is a locus of space vector currents $I_d$, $I_q$ resulting from a dq transformation of phase currents $I_u$, $I_v$, $I_w$. Obviously, the space vector currents $I_d$, $I_q$ are guided on a very direct path close to the zero vector to realize the safe state.

Figure 5:
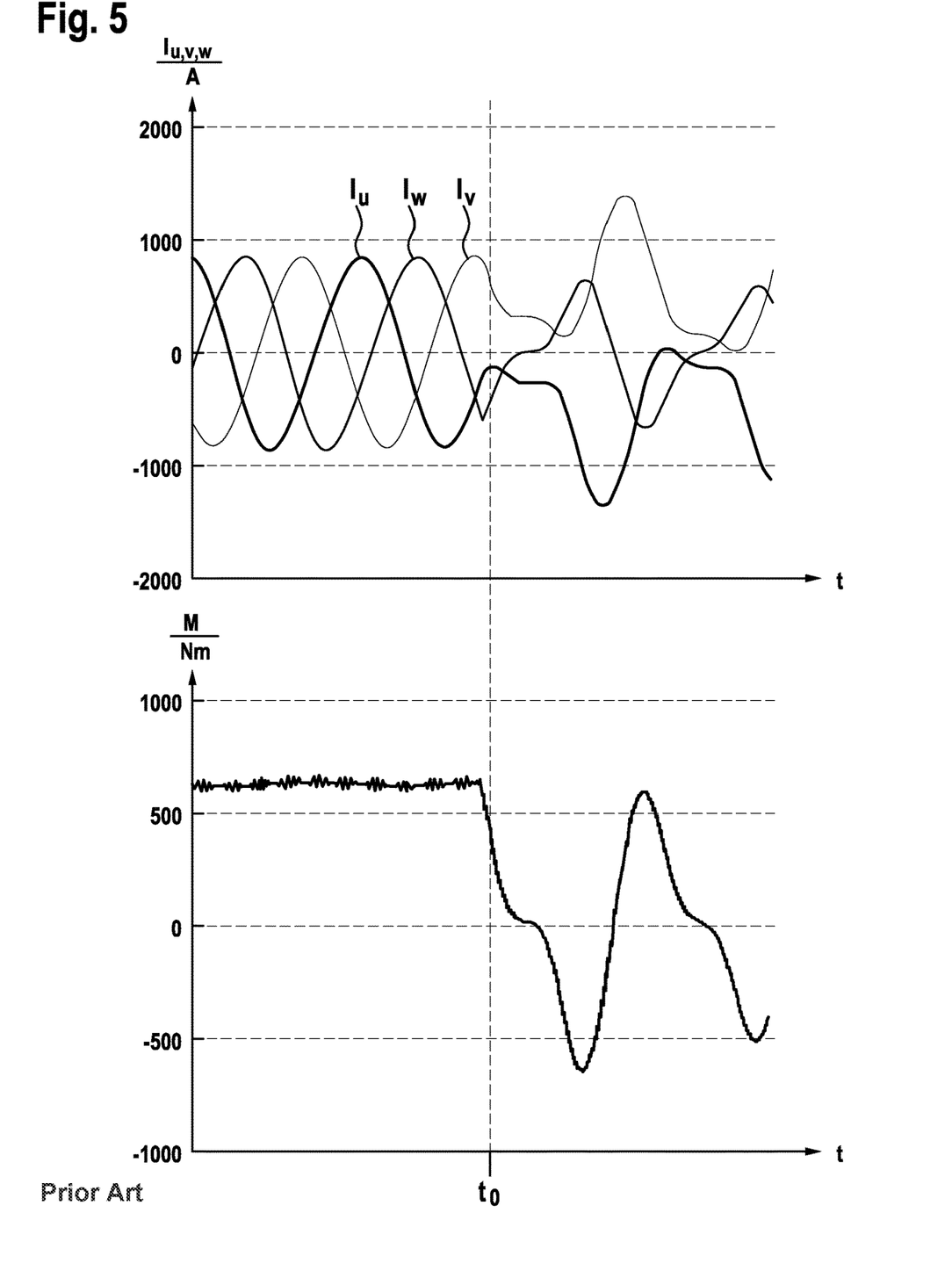
FIG. 5 curves of phase currents and a torque during operation of a prior art inverter.
Figure 6:
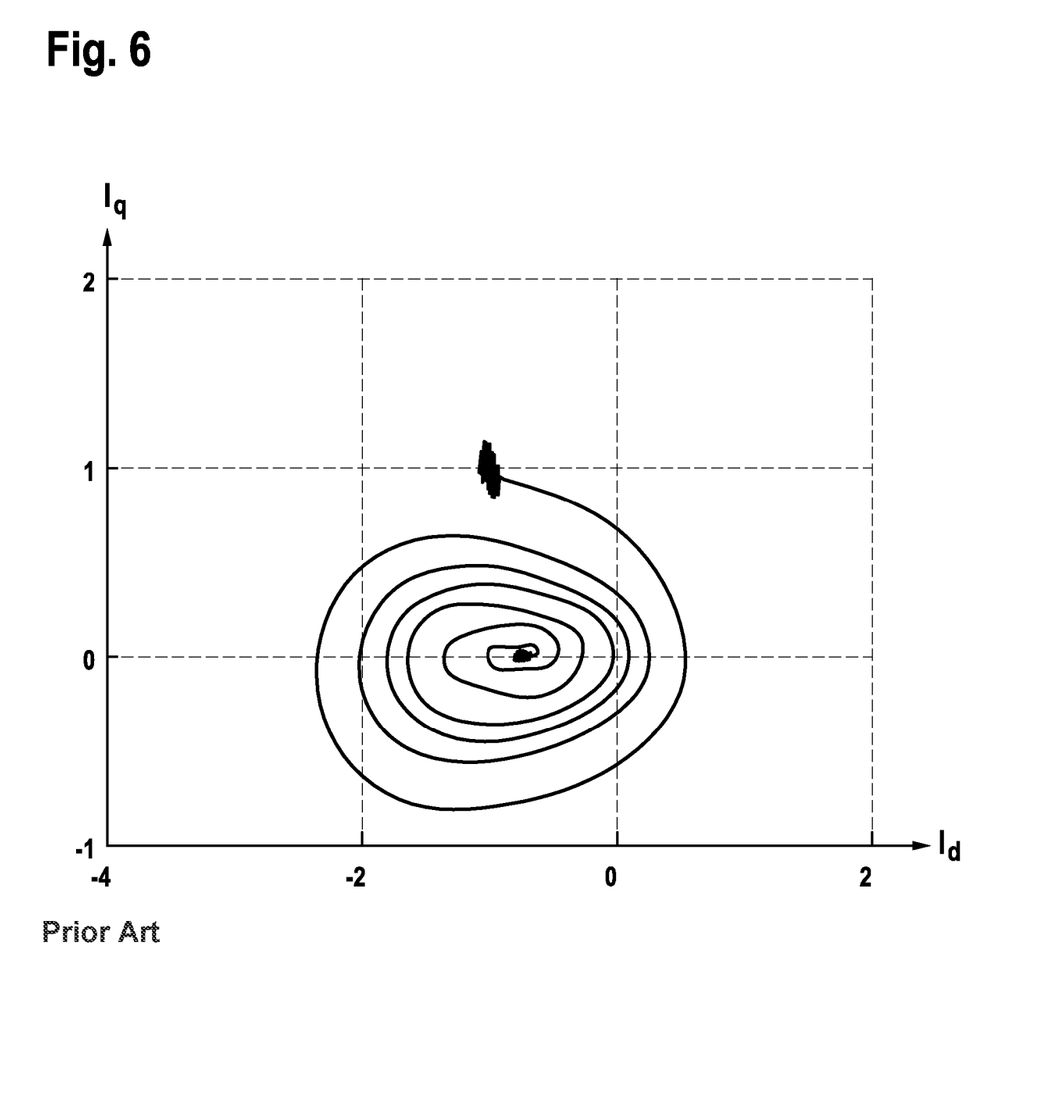
FIG. 6 a locus of space vector currents during operation of the prior art inverter.

For comparison, FIG. 5 shows curves of the phase currents $I_u$, $I_v$, $I_w$ and the torque M over time t, and FIG. 6 shows a locus curve of the space vector currents $I_d$, $I_q$ in dq coordinates if a complete, i.e. triple, active short circuit is switched instead of alternating between the single-phase active short circuit and the two-phase active short circuit as known in the prior art. Obviously, this results in considerable overshoots of the phase currents $I_u$, $I_v$, $I_w$ and undesirable torque changes. The locus curve also shows that the space vector currents $I_d$, $I_q$ only approach a steady state with a q component close to zero in a damped-oscillating manner.

While in the previously described embodiment example the time periods during which the single-phase active short circuit or the two-phase active short circuit is switched were substantially equal in length, it is possible in other embodiment example that the ratio of the time periods differs therefrom, for example a ratio of 60:40 is selected.

According to another embodiment, the inverter 1 shown in FIG. 1 has a total of six half-bridges for providing a six-phase alternating current for the electric machine 8. In this case, the first three half-bridges 9u, 9v, 9w are controlled in the safe operating mode as previously described and the other three half-bridges (not shown) are controlled differently in such a way that the two-phase active short circuit is switched first and then the single-phase active short circuit is switched. The switching strategy between the first half-bridges 9u, 9v, 9w and the other three half-bridges is therefore in opposite directions.

Figure 7:
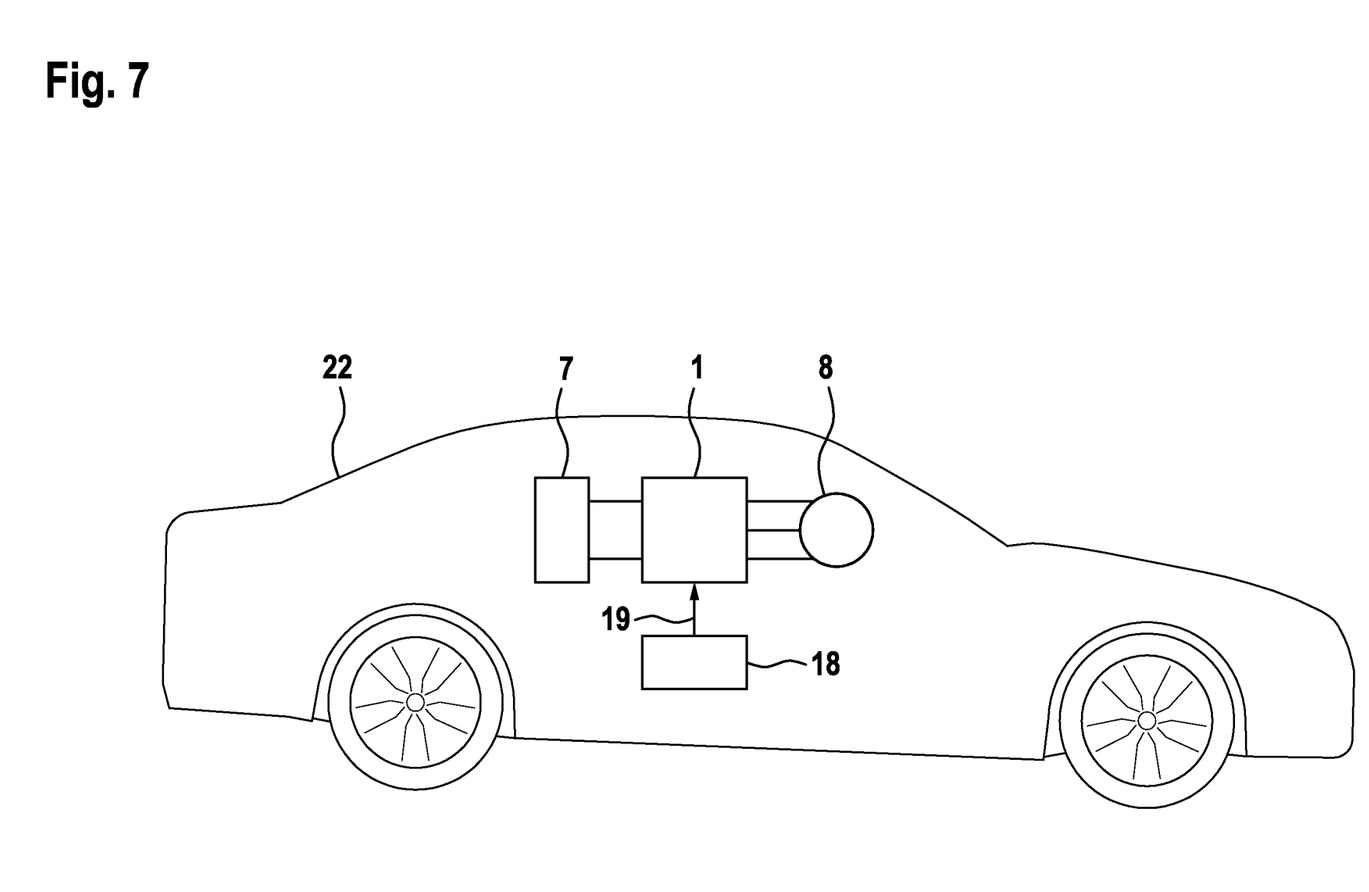
FIG. 7 a schematic sketch of an embodiment of the vehicle according to the invention.

FIG. 7 is a schematic sketch of an embodiment of a vehicle 22 comprising, analogously to FIG. 1, an inverter 1 according to one of the embodiments described above, an electric machine 8, a high-voltage battery 7, and a control unit 18 which, as a higher-level control unit, provides a signal 19 for activating a safe operating mode.

The invention claimed is:

1. A control device for an inverter comprising three half-bridges each having a first power switching element connected to a first DC voltage potential and a second power switching element connected to a second DC voltage potential, wherein the control device is arranged for driving the first and second power switching elements to convert a DC voltage present between the DC voltage potentials into a polyphase AC current in a normal operating mode and for transferring the inverter from the normal operating mode to a safe operating mode,
wherein the control device is further set up to drive the first and second power switching elements alternately in the safe operating mode for switching single-phase active short circuits and for switching two-phase active short circuits.

2. The control device according to claim 1, which is further arranged to drive a respective first power switching element for conducting when switching the single-phase active short circuit and to drive respective two first power switching elements for conducting when switching the two-phase active short circuit.

3. The control device according to claim 2, which is further adapted not to drive the first power switching element driven for conduction when switching the single-phase active short circuit for conduction when switching the two-phase active short circuit.

4. The control device according to claim 1, which is further adapted to first drive the power switching elements to switch the single-phase active short circuit at the start of the safe operating mode.

5. The control means according to claim 4, which is further arranged to determine phase current values of the polyphase alternating current and to select a power switching element for the first single-phase active short circuit whose half-bridge carries a largest phase current in terms of magnitude when transferred to the safe operating mode.

6. The control device according to claim 1, which is further arranged to switch the single-phase active short circuits each for a first time period and the two-phase active short circuits each for a second time period different from the first time period.

7. An inverter for a vehicle, comprising the three half-bridges each having the first power switching element connected to the first DC voltage potential and having the second power switching element connected to the second DC voltage potential, and the control device according to claim 1.

8. A vehicle comprising an electric machine adapted to drive the vehicle, and the inverter according to claim 7 adapted to power the electric machine.

9. A method of operating an inverter comprising three half-bridges each having a first power switching element connected to a first DC potential and having a second power switching element connected to a second DC potential, comprising the steps of:
  driving the power switching elements in a normal operating mode to convert a DC voltage present between the DC potentials into a polyphase AC current;
  transferring the inverter from the normal operating mode to a safe operating mode; and
  alternate switching of single-phase active short circuits and two-phase active short circuits by the power switching elements in safe operating mode.

\* \* \* \* \*